United States Patent [19]

Stürtz

[11] Patent Number: 5,370,835
[45] Date of Patent: Dec. 6, 1994

[54] METHOD OF MANUFACTURING RECTANGULAR FRAMES

[75] Inventor: Karl-Heinz Stürtz, Neustadt, Germany

[73] Assignee: Willi Stürtz Maschinenbau GmbH, Neustadt, Germany

[21] Appl. No.: 979,142

[22] Filed: Nov. 20, 1992

[30] Foreign Application Priority Data

Nov. 21, 1991 [DE] Germany .................. 4138352

[51] Int. Cl.$^5$ .................. B29C 65/20; B29C 71/00
[52] U.S. Cl. .................. 264/248; 264/161; 264/297.5; 264/297.8; 156/304.6; 425/506
[58] Field of Search ............ 264/248, 296, 232, 297.5, 264/297.6, 161, 297.8; 156/304.2, 304.5, 304.6, 309.6; 425/506, 517

[56] References Cited

U.S. PATENT DOCUMENTS

| | | | |
|---|---|---|---|
| 3,809,739 | 5/1974 | Gelin | 264/297.6 |
| 4,718,960 | 1/1988 | Pasqualini | 264/296 |
| 4,752,350 | 6/1988 | Schuster | 156/304.5 |
| 4,909,892 | 3/1990 | Quinn et al. | 156/304.6 |
| 4,995,935 | 2/1991 | Ganzberger | 156/304.6 |
| 5,006,198 | 4/1991 | Pasquini | 156/304.6 |
| 5,063,015 | 11/1991 | Lloyd et al. | 264/232 |
| 5,073,329 | 12/1991 | Carrara | 264/297.6 X |

FOREIGN PATENT DOCUMENTS

| | | | |
|---|---|---|---|
| 1910309 | 9/1970 | Germany | 156/304.6 |
| 0200785 | 6/1983 | Germany | 156/304.6 |
| 3408373 | 6/1986 | Germany | 264/248 |

*Primary Examiner*—Mathieu Vargot
*Attorney, Agent, or Firm*—Anderson Kill Olick & Oshinsky

[57] ABSTRACT

A method of manufacturing rectangular frames made of plastic materials, in which at least two four-head welding machines arranged on a turntable are alternatively fitted out with four plastic shaped pieces cut to a predetermined length with corresponding mitres, and clamped together. A frame is welded in a respective welding machine by applying heat and pressure to all mitre surfaces to form welding beads thereat. The welded frame is then transferred to a cleaning machine for treatment of protruding weld bead portions.

4 Claims, 1 Drawing Sheet

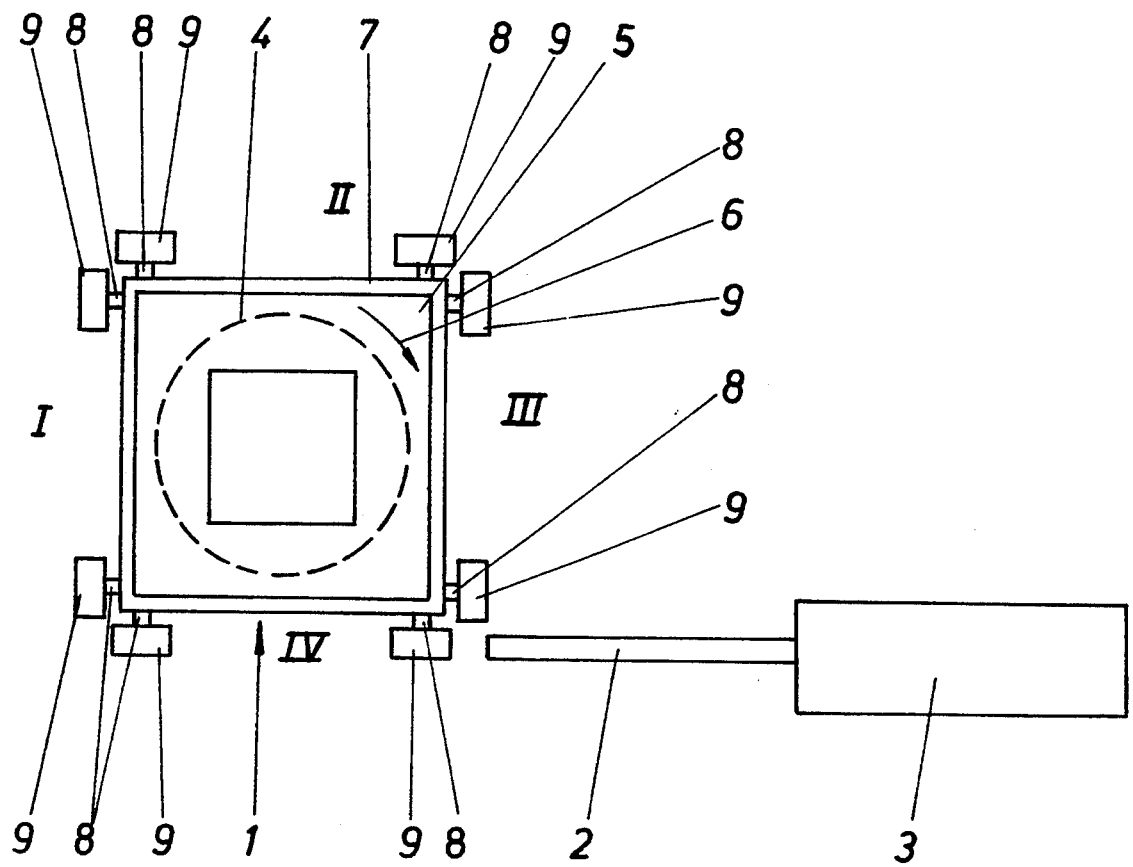

METHOD OF MANUFACTURING RECTANGULAR FRAMES

BACKGROUND OF THE INVENTION

The invention relates to a method of manufacturing rectangular framers, in particular window frames made of plastic shaped pieces, in which four plastic shaped pieces, cut to an appropriate length with mitres, are clamped, by using exchangeable welding shims corresponding to the piece cross-section in a four-head welding machine and are simultaneously welded with each other at all mitre surfaces under action of heat and pressure by formation of weld beads, with subsequent treatment of the frame in a cleaning, e.g., sandblast machine. In the cleaning machine, the protruding weld beads are removed. The invention also relates to an apparatus for effecting the inventive method.

The production of window frames or the like from plastic materials is effected in the following manner. Four plastic shaped pieces cut to a predetermined length with appropriate mitres are positioned manually one after another in a so-called four-head welding machine. Then, they are aligned and clamped together. By using four plate-like heating devices, the plastic shaped pieces are simultaneously heated, at their adjacent mitre surfaces, to a predetermined temperature, which is selected so that the connected mitre surfaces, after removal of the heating devices, are welded to each other by being pressed against each other, thereby forming weld beads. After a predetermined cool-down period, the welded window frames are transported to a cleaning machine in which the weld beads, at least in the region of visible surfaces of window frames, are treated or eliminated. The welding of plastic shaped pieces, with a known four-head welding machine, takes place mostly in a position in which the weldable window frame is in a vertical or substantially vertical position, and in this position, is transported from the four-head welding machine to the cleaning machine.

During treatment of the weld beads of such a window frame, it is possible to treat separate angles one after another when the window frame always, after treatment of one angle, is rotated in its plane by 90°. Their successive treatment of separate angles takes a substantial amount of time, although the treatment process of one angle is conducted relatively quickly. The substantial amount of time is taken by the rotation of the frame after each treatment. Therefore, the total time of production of a frame is considerably longer than the time necessary for positioning of the plastic shaped pieces and their welding into the window frame. As a result, more rapid cycle time of the welding machine should be adapted to the lower cycle time of the angle cleaning machine.

There is an angle cleaning machine for window frames formed of plastic shaped pieces that are welded together, which is able to treat all four angles of the window simultaneously. A cleaning machine is known that has a considerably lower cycle time than a four-head welding machine. In this case, the angle cleaning machine arranged in a production line with a four-head welding machine, cannot be used in an economical manner. To eliminate this drawback, it is possible to use such a cleaning machine with two four-head welding machines. However, this requires, primarily due to the need for additional conveyors, not insubstantial investments. On the other hand, an additional operator is needed for the second four-head welding machine. The salary of this additional operator not insignificantly increases production costs of a window frame.

To reduce the investment expenses and salary costs, it is known to place into a four-head welding machine, by using additional shims, plastic shaped pieces for two window frames having the same dimensions and profiles. This means that a window frame and a door frame cannot be simultaneously produced in such a welding machine. However, positioning of double plastic shaped pieces is very time consuming. On the other hand, with those double window frames, there exists a drawback in that both simultaneously welded window frames should again be separated. This requires providing a separating device in the production line. However, use of such a separating device results in a significantly higher need for additional floor space for manufacturing and treatment of window frames. But, such floor space is mostly unavailable or providing it is accompanied by additional costs.

Accordingly, the main object of the invention is a method for manufacturing rectangular frames, in particular window frames from plastic materials, which can be effected in a relatively small space, without high investment expenses, while insuring the possibility of using a modern and rapid angle cleaning machine in an economical manner.

SUMMARY OF THE INVENTION

This and other objects of the invention are achieved by providing a method, in which at least two four-head welding machines, which are arranged on a turntable, are alternatively fitted with plastic shaped pieces, and the plastic frames are alternatively welded.

This method permits the increase in the number of welded window frames produced in a unit of time and thereby better use of the capacity of the angle cleaning machine. The method as well as the apparatus for effecting the method does not require especially high additional investment expenses, and can be implemented in a very small space, mostly with available floor space capacity. It also permits a better use of operational personal, as the operator is only required to position the plastic shaped pieces, so that production costs of a window frame, which include salary expenses, are reduced.

BRIEF DESCRIPTION OF THE DRAWINGS

The objects and features of the present invention will become more apparent and the invention itself will be best understood from the following detailed description of the preferred embodiment of the invention when read with reference to the accompanying drawings, wherein:

Single FIGURE of the drawing shows a schematic view of an apparatus for producing window frames from plastic materials according to the invention.

DETAILED DESCRIPTION OF THE PREFERRED EMBODIMENT

The drawing shows schematically an automatic apparatus for producing window frames of plastic profiled pieces, which apparatus is advantageously controlled from a central computer. The apparatus according to the invention comprises a so-called welding roundabout installation 1 with which an angle cleaning machine, shown only schematically is connected. The cleaning machine 3 is connected with the welding roundabout installation by an intermediate conveyor 2 which also serves as a buffer station.

The welding roundabout installation has a base plate, not shown in the drawing, on which, e.g., a turntable 5 is supported by a ball turning attachment. The turntable 5 is provided with a, per se known, drive, not shown in the drawings. The drive rotates the turntable 5 in the direction of arrow 6 in steps of 90°. Preferably, the turntable 5 has a square base surface. The turntable 5 carries a square stand 7 formed of metal shaped pieces and having side surfaces which, when viewed upwards from below, are tilted inward by an angle of about 5-15°, so that the stand has a truncated pyramidal shape. On each side surface of the stand 7, there are provided, respectively, two guide rails 8 movable relative to each other. At least one guide rail is fixedly secured to the stand 7 while the other guide rail is displaced parallel to the stationary guide rail by a per se known drive, not shown in the drawings. If necessary, both guide rails 8 can be made displaceable. Two welding units 9 are movable on their respective guide rails relative to one another. Preferably, the lower welding unit is fixedly secured to a respective guide rail, and the upper welding unit moves toward and away from the lower welding unit. The two upper welding units which are arranged on two guide rails 8 of one side of the stand 7, are always synchronously movable relative to the respective lower welding units 9. Each welding unit 9 comprises, as per se known, two clamping elements and one plate-like heating device, a so-called heated tool.

In the shown and discussed embodiment, all four sides of the stand 7 are similarly formed, such that they are provided, on each side, with two guide rails 8, each with two welding units 9 and, thus, a complete welding machine. All four welding machines are controlled from a common control station which controls the welding machines only in predetermined positions of the separate machines. Because of the square shape of turntable 5, each side of the stand 7 and, thus, each welding machine thereat can be moved successively into positions I-IV.

In position I, the welding machine is fitted out, e.g., manually with four plastic shaped pieces. All welding units 9, which are in the position I and are controlled by a single program, are brought into a predetermined position in which the plastic shaped pieces, which are cut to a predetermined length with appropriate mitres, are arranged and clamped together. Each welding unit 9 is equipped with so-called welding shims corresponding to a cross-section of a plastic shaped piece. Normally, for correct positioning and clamping of the plastic shaped pieces about 30-40 seconds is necessary.

After positioning and clamping of the plastic shaped pieces, the drive of the turntable 5 is actuated, and the turntable 5, together with the stand 7, is rotated by 90°, until the clamped plastic shaped pieces are in position II. During the rotating process and, thus, immediately after appropriate positioning and clamping of the plastic shaped pieces, the heated tool is introduced between adjacent mitres, and the shaped pieces are moved by the welding units 9. The shaped pieces are moved in such a way that all mitre surfaces are heated to such an extent that they, after removal of the heated tools and their further movement toward each other, are welded to each other as a result of pressure applied to them. With this, the actual welding process takes place in position II of the turntable 5. In position I of the turntable, meanwhile, a new plastic shaped pieces for another window frame can be positioned. As soon as their positioning is finished, they are moved by the corresponding movement of the turntable 5 into position II and are, there, welded with each other to form a new window frame.

In the position III of the turntable 5, the welded window frame is not subjected to any treatment. In this position, only cool-down of the welding joints takes place. In position IV of turntable 5, the clamping elements of the welding units are open, and the finished welded window frame is transferred in the per se known way to the intermediate conveyor 2. The welded window frame is then transported into angle cleaning machine 3 in which all angles of the welded window frame are simultaneously cleaned.

The shims of the welding units 9 of a welding machine can be differently formed, so that it is possible, without replacement of shims, alternatively, in two welding machines to produce a window and a door frame, respectively.

Dependent on the time of welding and cool-down, it may be advantageous to provide two angle cleaning machines 3 for the turntable 5 with the welding machines. In this case, they should be arranged at an angle of 180° to each other. If necessary, more than four welding machines can be provided on the turntable 5.

While a particular embodiment of the invention has been shown and described, various modifications thereof will be apparent to those skilled in the art and, therefore, it is not intended that the invention be limited to the disclosed embodiment or the detail thereof, and departures may be made therefrom within the spirit and scope of the invention defined in the appended claims.

What is claimed is:

1. A method of manufacturing rectangular frames made of a plastic material, said method comprising the steps of:

providing a welding installation including a turntable and at least two four-head welding machines spaced from each other, supported on the turntable and equipped with different welding shims and clamping means;

fitting out alternatively one of the at least two welding machines, by using corresponding welding shims, with four plastic shaped pieces cut to a predetermined length with corresponding mitres and clamping the four pieces together, while another frame is being welded on another of the at least two welding machines;

welding a frame by simultaneously applying heat and pressure to all mitre surfaces of the four pieces to form welding beads thereat; and transferring the welded frame to a cleaning machine for treating protruding weld bead portions.

2. A method set forth in claim 1, wherein four four-head welding machines are supported on the turntable, said fitting out step includes fitting all four-head welding machines one after another with plastic shaped pieces, and said welding step including welding four frames one after another.

3. A method set forth in claim 1, wherein four four-head welding machines are supported on the turntable, said fitting out step including fitting out two welding machines that are not adjacent, simultaneously with two sets of plastic shaped pieces, respectively, and said welding step including alternatively welding two frames in the respective two welding machines that are not adjacent.

4. A method set forth in claim 1, wherein said fitting out step includes fitting out individual four-head machines, respectively with two sets of plastic shaped pieces with plastic shaped pieces of each set having different cross-sections.

* * * * *